UNITED STATES PATENT OFFICE.

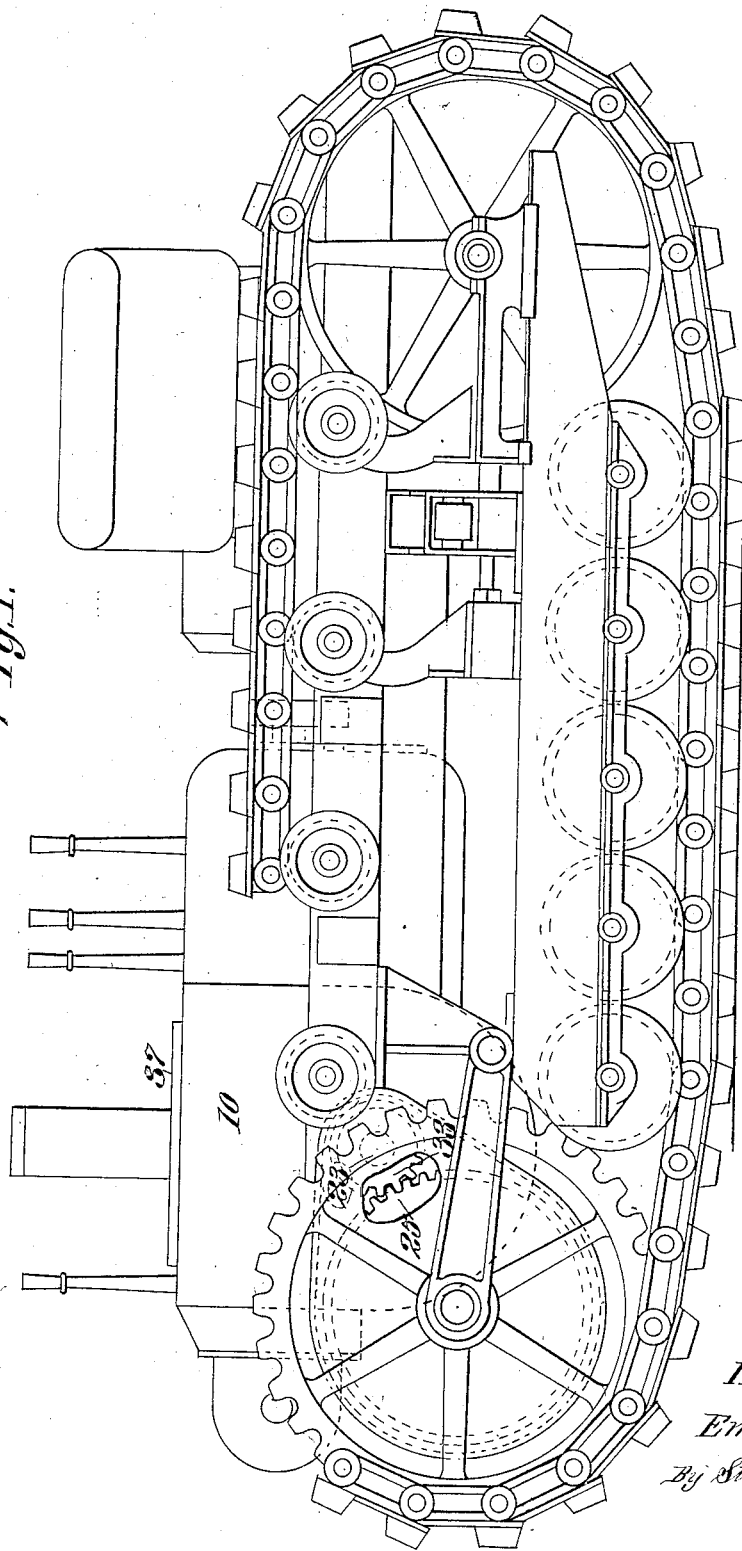

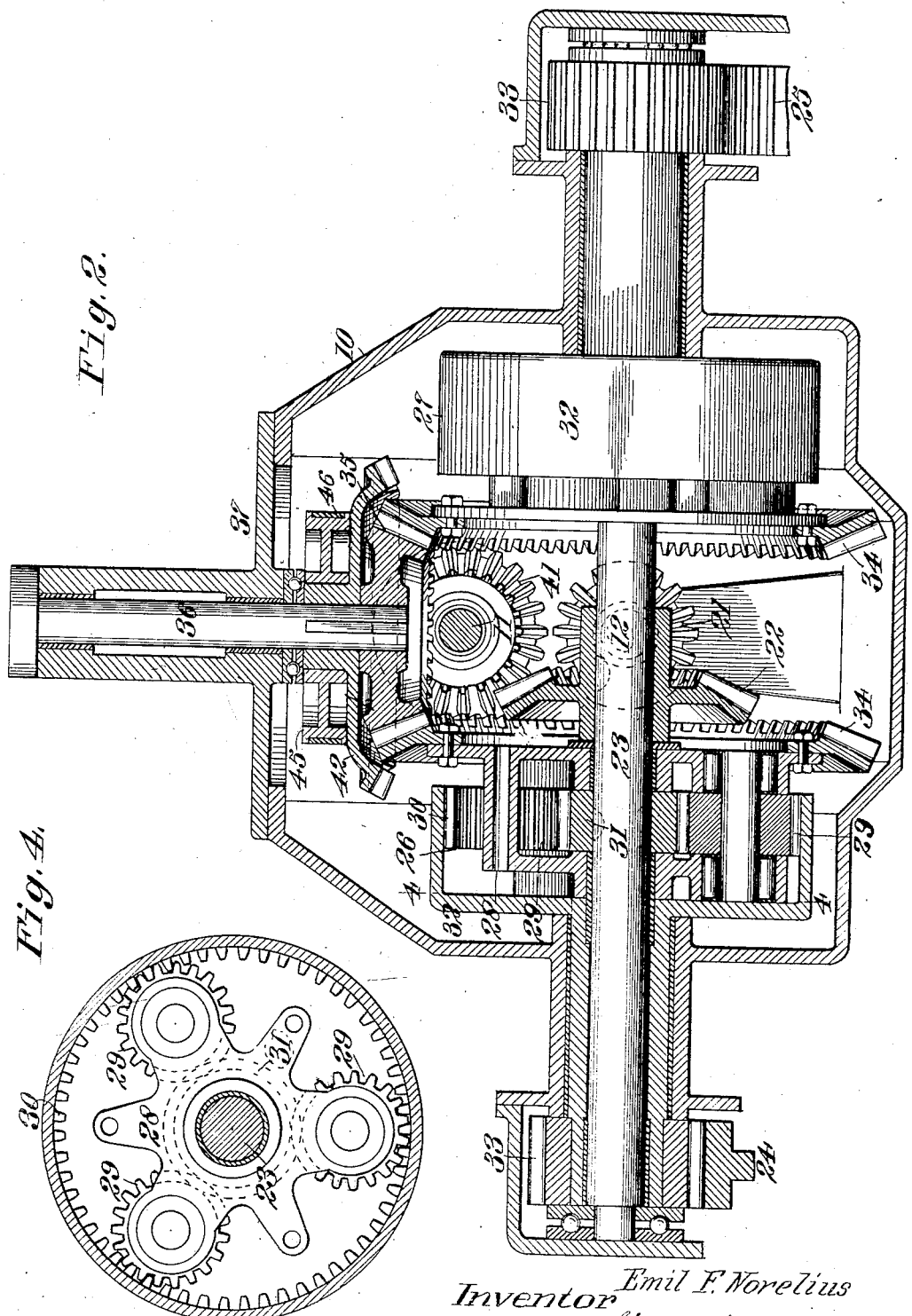

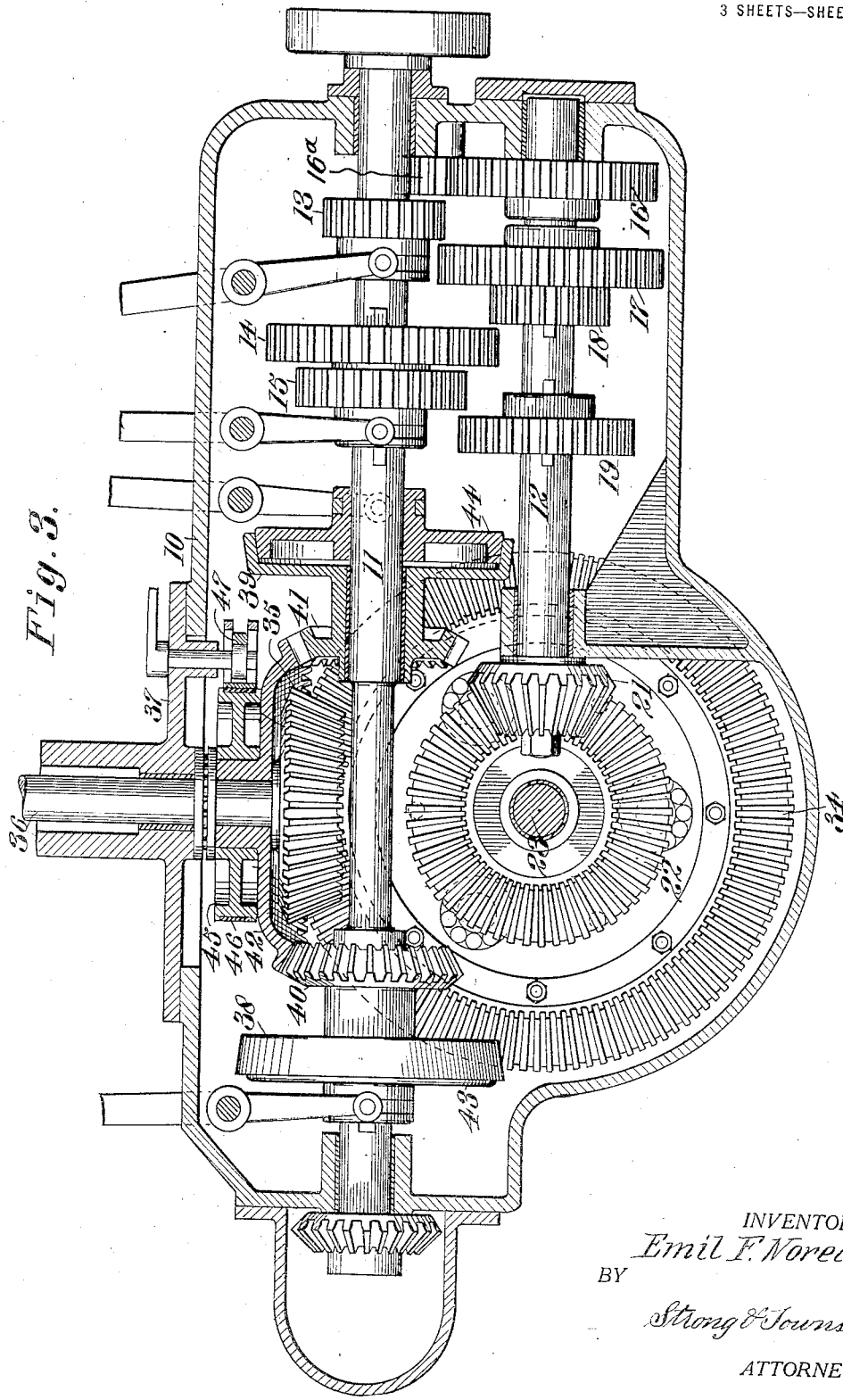

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR TRANSMISSION.

1,395,004.  Specification of Letters Patent.  Patented Oct. 25, 1921.

Application filed September 17, 1918. Serial No. 254,443.

*To all whom it may concern:*

Be it known that I, EMIL F. NORELIUS, a citizen of the United States, residing at Peoria, in the county of Peoria and State of Illinois, have invented a new and useful Improvement in Tractor Transmission, of which the following is a specification.

This invention relates to a power transmission mechanism, and particularly pertains to steering means especially adapted for use with tractors of the chain tread type.

In operating tractors of the chain tread type, it has been found that one of the prime factors in the proper performance of the vehicle is to provide positive means for controlling and varying the relative lineal speed of travel of the tracks to effect a steering of the vehicle. It has been common practice to provide a transmission with variable speed driving means adapted to separately operate the two tracks of the vehicle, and which means are controlled by friction clutches. These members cause a considerable loss of power due to friction and furthermore often become inoperative or develop a slipping action between their members at which time the steering will not be positive. It is, therefore, the prime object of the present invention to provide positive means for continuously and variably driving separate tracks of a tractor, without an appreciable power loss and insuring that all of the driving elements will be in positive engagement at all times, thus eliminating an interposition of friction clutches, and other separable driving members in the delivery of power.

The present invention embodies the use of a variable speed transmission of common construction in connection with which dual differential mechanisms are provided, said mechanisms being capable of uniform rotation or variable relative speeds, the control of said differentials being indirectly effected by the rotation of the main transmission drive shaft as initiated by the manipulation of independent clutch members.

The invention is illustrated by way of example in the accompanying drawings in which—

Figure 1 is a view in side elevation illustrating the transmission as applied for use upon a tractor of the common chain tread track type.

Fig. 2 is a view in vertical transverse section and elevation illustrating the transmission, and particularly disclosing the means concerned with the steering thereof.

Fig. 3 is a view in longitudinal vertical section through the transmission illustrating the steering means, as well as the speed changing structure.

Fig. 4 is a vertical transverse section on line 4—4 of Fig. 2.

Referring more particularly to the drawings, 10 indicates a gear case of suitable design, which is provided with bearings for receiving a main drive shaft 11, and a jack shaft 12. This last named shaft is disposed in parallel spaced relation to the drive shaft and therebeneath. The drive shaft extends the full length of the case, and is provided at its driving end with speed changing gears 13, 14 and 15, which are adapted to be brought into driving relation to complementary gears 16, 16$^a$, 17, 18 and 19. The construction and manipulation of these gears does not require explanation, as they constitute a common three-speed transmission with which the present invention is not particularly concerned, except as they determine the various turning arcs described by the vehicle as it travels at different speeds.

The stub shaft 12 is provided at its inner end with a bevel gear pinion 21 in mesh with bevel gear 22. This gear is fixed upon a transverse driving shaft 23 by which power is indirectly transmitted to opposite truck bull gears 24 and 25 of the tractor. A gear 22 is disposed substantially at the middle of the length of the shaft 23 and between individual planetary gear sets 26 and 27, which separately affect the gears 24 and 25, respectively.

The planetary gear transmissions each consist of a spider 28 freely mounted upon the shaft 23 and carry the planetary pinions 29. These pinions are in constant mesh with a circumscribing ring gear 30 and central driving pinion 31 keyed to the shaft 23. The ring gear 30 is formed around the internal face of a sleeve drum 32. This drum is freely mounted to rotate upon the shaft 23, and extends outwardly through a bearing in the side of the case. Here it is fitted with a driving pinion 33. This pinion may be designed to mesh with the bull gear at each side of the mechanism, or may be inclosed by the driving sprocket of the truck if the construction will so permit. In any event the member 32 is provided to drive one of the side tracks of the tractor. It will be understood that this planetary gear structure is made in duplicate, and that by this dual application the two tracks of the tractor will be separately actuated as the transverse shaft 23 is driven through rotation on the jack shaft 12.

In order to establish a coöperating movement between the planetary gear sets, they are provided with large bevel gears 34, which are placed on the adjacent inner faces of the spiders 28, and mesh with an interposed bevel pinion 35. This pinion is keyed to a vertically extending shaft 36, which is rotatably secured in a bearing formed through the top plate 37 of the transmission case. It will be readily recognized that a stationary condition of the connecting pinion 35 will cause operation of the planetary gear sets to drive the opposite trucks of the tractor forwardly as impelled by the transmission. Rotation of this gear, however, will rotate the spiders of the two transmissions in diametrically opposite directions, and will cause one of the chain tracks to move at a speed greater than the speed of the tracks when moving in unison, while the other track will move at a lesser speed. This movement will produce a steering action.

The movement of the gear 35 to produce a steering action as relative speeds of the tracks are varied is effected by power driven means. This means consists of a pair of oppositely disposed cone clutches 38 and 39, which are freely mounted upon the main drive shaft 11 of the transmission. These clutches are furthermore disposed upon opposite sides of the vertical axis of the transmission, that is, upon opposite sides of the axis of shaft 36 as the latter is in the same vertical plane with the axis of the transverse shaft 23. The cone members 38 and 39 are formed at their adjacent ends with bevel pinions 40 and 41, which are constantly in mesh with a common bevel gear 42 keyed upon the shaft 36, and disposed directly above the connecting bevel gear 35 previously described. The two cone clutches may be separately and selectively driven from the shaft 11 by slidable clutch members 43 and 44, which are splined upon the shaft 11, and are controlled by suitable shifting yokes, with which a steering lever is connected.

Inequalities in the roadway will offer variable resistance to two tracks of the vehicle and will cause them to operate at different speeds as permitted by the differential gearing in the transmission. To avoid this a brake drum 45 is fixed to the gear 42 and is normally gripped by a band 46 actuated by a cam 47. This cam is connected with the shifting mechanism of clutches 43 and 44 and simultaneously releases as they engage.

In the operation of this device power is delivered to the shaft 11 from a suitable power source, and is thereafter transmitted to the jack shaft 12 at a speed determined by the position of the speed changing gears in relation to each other. As the jack shaft 12 is rotated it imparts motion to the transverse shaft 23 through the pinion 21 and the gear 22. This motion produces simultaneous rotation of the complementary gears 31 in each of the planetary gear sets. As these gears rotate they are engaged by the pinions 29, which are also in mesh with the ring gears 30, and will, under ordinary conditions cause the two sleeve drums 32 to rotate at equal speeds and in unison with the drive shaft 23. This construction, however, provides for differential movement, which is common in vehicle power transmission mechanisms, and normally eliminated by the brake band 46. In case a positive variable speed ratio is to be established between the two tracks of the vehicle, one of the clutches 43 or 44 is thrown into mesh with its respective clutch cone by means of the steering mechanism as the brake is released. This will lock the cone to rotate with the main drive shaft, and indirectly act through gear 42 to produce the desired and continued rotation of the connecting pinion 35. This speed of rotation will directly influence the effective speeds of rotations of the drum sleeves through their spiders, and cause one of the drums to increase its speed, while decreasing the speed of the opposite drum. It will be noted that the minimum and maximum speeds of the opposite tracks will be in equal ratio and relation to the mean speed of the vehicle as in the case when the two tracks were moving at equal speeds. Attention is further directed to the fact that all of the gears concerned in the variable speed drive are in constant mesh, and the clutch action is transferred from the original set of driving clutches to a set of minor clutches, which merely operate the speed varying means. Manipulation of the speed change gears will cause the vehicle to describe different arcs as determined by the driving ratio of the shaft 23 in relation to the speed of the gear spider.

It will thus be seen that the structure here disclosed affords a continuous and positive driving means for the tracks of a chain tread tractor, and, at the same time allows the lineal speed of said tracks to be positively varied without the possibility of inoperation in the transmission means.

One important result attained by the arrangement is that the radius of the arc described by the tractor in turning increases with the speed of the vehicle; that is to say, when coupled in high gear the radius is long or the curve described by the tractor is gradual, and when coupled in low gear the radius is short and the curve described by the tractor is sharp.

Having thus described my invention, what I claim and desire to secure by Letters Patent is:

1. The combination of a pair of driven members, a drive member, planetary gearing between the drive member and each driven member, rotatable means interposed between opposite planetary gear sets and connected to a speed changing element in each of the latter for controlling the same, and power operated means for actuating said last mentioned control means in either direction whereby to produce a differential rotation of said planetary gear sets.

2. The combination of a pair of driven members, a drive member, planetary gearing between the drive member and each driven member, rotatable means interposed between opposite planetary gear sets and connected to a speed changing element in each of the latter for controlling the same, power operated means for actuating said last mentioned control means, and operative connections between the power operated means and the control means for actuating the latter in either direction and at variable speeds.

3. In a tractor transmission, a main shaft, a driving axle disposed at right angles to said shaft, speed changing gears adapted to impart motion from the main shaft to the axle, separate planetary gear sets actuated by the rotation of said axle and power driven means for positively actuating said gear sets to produce an acceleration in the speed of one set, and a proportionate retardation in the speed of the other set while being driven by the constantly rotating action.

4. In a tractor transmission, a main shaft, a driving axle disposed at right angles to said shaft, speed changing gears adapted to impart motion from the main shaft to the axle, separate planetary gear sets actuated by the rotation of said axle and power driven means for positively actuating said gear sets to produce an acceleration in the speed of one set, a proportionate retardation in the speed of the other set while being driven by the constantly rotating action, and means whereby predetermined speed ratios may be established between the two gear sets and the driving axle.

5. In a tractor transmission, a main shaft, a transversely extending driving axle, gears uniting the axle and the shaft, driving gears fixed to the axle, gear spiders rotatably disposed around the axle, planetary gears carried by the spiders and in mesh with the driving gears, gear sleeves circumscribing the planetary gears and driven thereby, and means whereby the gear spiders may be positively rotated in opposite directions to each other while the gears carried thereby are driven in a single direction, thus causing variation in the driving speeds of the two gear sleeves.

6. In a tractor transmission, a main shaft, a transversely extending driving axle, gears uniting the axle and the shaft, driving gears fixed to the axle, gear spiders rotatably disposed around the axle, planetary gears carried by the spiders and in mesh with the driving gears, gear sleeves circumscribing the planetary gears and driven thereby, means whereby the gear spiders may be positively rotated in opposite directions to each other while the gears carried thereby are driven in a single direction, thus causing variation in the driving speeds of the two gear sleeves, and means normally holding said gear spiders in fixed relation to each other.

7. A power transmission mechanism comprising a constantly rotating main shaft, a jack shaft, speed changing gears adapted to be selectively operated to connect the two shafts, a transversely extending driving axle continuously rotated by the jack shaft, separate driving units carried at the opposite ends of said axle, and means affected by the rotation of the main shaft whereby the speed of rotation of the driving units may be positively varied inversely.

8. A power transmission mechanism comprising a constantly rotating main shaft, a jack shaft, speed changing gears adapted to be selectively operated to connect the two shafts, a transversely extending driving axle continuously rotated by the jack shaft, separate driving units carried at the opposite ends of said axle, selectively operated steering clutches upon the main shaft, and means whereby alternate engagement of said clutches will positively affect the driving units to produce an alternate acceleration in the driving speed of said units.

9. A power transmission mechanism comprising a constantly rotating main shaft, a jack shaft, speed changing gears adapted to be selectively operated to connect the two shafts, a transversely extending driving axle continuously rotated by the jack shaft, separate driving units carried at the opposite ends of said axle, selectively operated steering clutches upon the main shaft, means whereby alternate engagement of said clutches will positively affect the driving units to produce an alternate acceleration in the driving speed of said units, and means for normally holding said speed changing mechanism against operation.

10. In a tractor transmission, a constantly rotating main shaft, a pair of separate gears carried by said shaft, a steering gear with which both of said gears are in mesh, clutch mechanisms for connecting the gears in driving relation to the main shaft, a single control mechanism for alternately actuating said clutches, a driving axle driven by the main shaft, separate driving units at the opposite ends of said axle, and means connecting the driving units with the steering gear whereby positive speed variation may be produced between the driving units.

11. In a tractor transmission, a constantly rotating main shaft, a pair of separate gears carried by said shaft, a steering gear with which both of said gears are in mesh, clutch mechanisms for connecting the gears in driving relation to the main shaft, a single control mechanism for alternately actuating said clutches, a driving axle driven by the main shaft, separate driving units at the opposite ends of said axle, means connecting the driving units with the steering gear whereby positive speed variation may be produced between the driving units, and means for normally holding the steering gear mechanism against operation.

12. In a tractor transmission, a main shaft, a driving shaft at right angles thereto, and adapted to be rotated thereby, separate driving units carried upon the axle, said units comprising independent driving sleeves, driving gears fixed to the axle and interposed planetary gears, rotatable spiders carrying said gears, operating gears fixed to each of said spiders, a common steering gear meshed with both of said operating gears, a secondary steering gear carried by the shaft of the main steering gear, separately operated gears mounted upon the main shaft, and in mesh with said secondary gear, and clutch means for each of said main shaft gears whereby they may be alternately connected with the main shaft to effect rotation of the steering gears and oppositely rotate the spider gears.

13. The combination of a pair of driven members, a drive member, planetary gearing between the drive member and each of the driven members, rotatable means interposed between opposite planetary gear sets and connected to a speed changing element in each of the latter for controlling the same, a power driven member and oppositely rotating controllable connections between the power driven member and the control means.

14. The combination of a pair of driven members, a drive member, planetary gearing between the drive member and each of the driven members, rotatable means interposed between opposite planetary gear sets and connected to a speed changing element in each of the latter for controlling the same, a power driven member and oppositely rotating connections between the power shaft and the control means and a controllable friction clutch included in each of the said connections.

15. The combination of a pair of driven members, a drive member, a planetary gear set between the drive member and each driven member, including a normally inactive spider on which the intermediate gears of the planetary set are journaled, a ring gear for each of said spiders, and a controllable power operating gear intermeshing with said ring gears whereby to affect said planetary gear sets in a manner to produce a positive differential driving action.

In testimony whereof I have hereunto set my hand in the presence of two subscribing witnesses.

EMIL F. NORELIUS.

Witnesses:
C. A. WHITNALL,
WM. F. ZOBRISKIE.